Aug. 31, 1926.
J. P. FISHER
1,597,678
HEAT INTERCHANGER
Filed Oct. 23, 1922  2 Sheets-Sheet 1
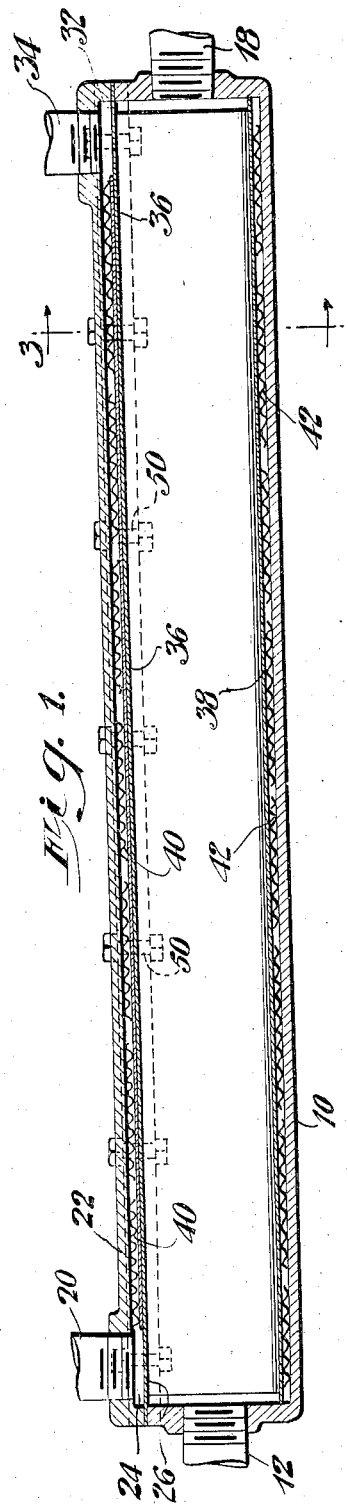
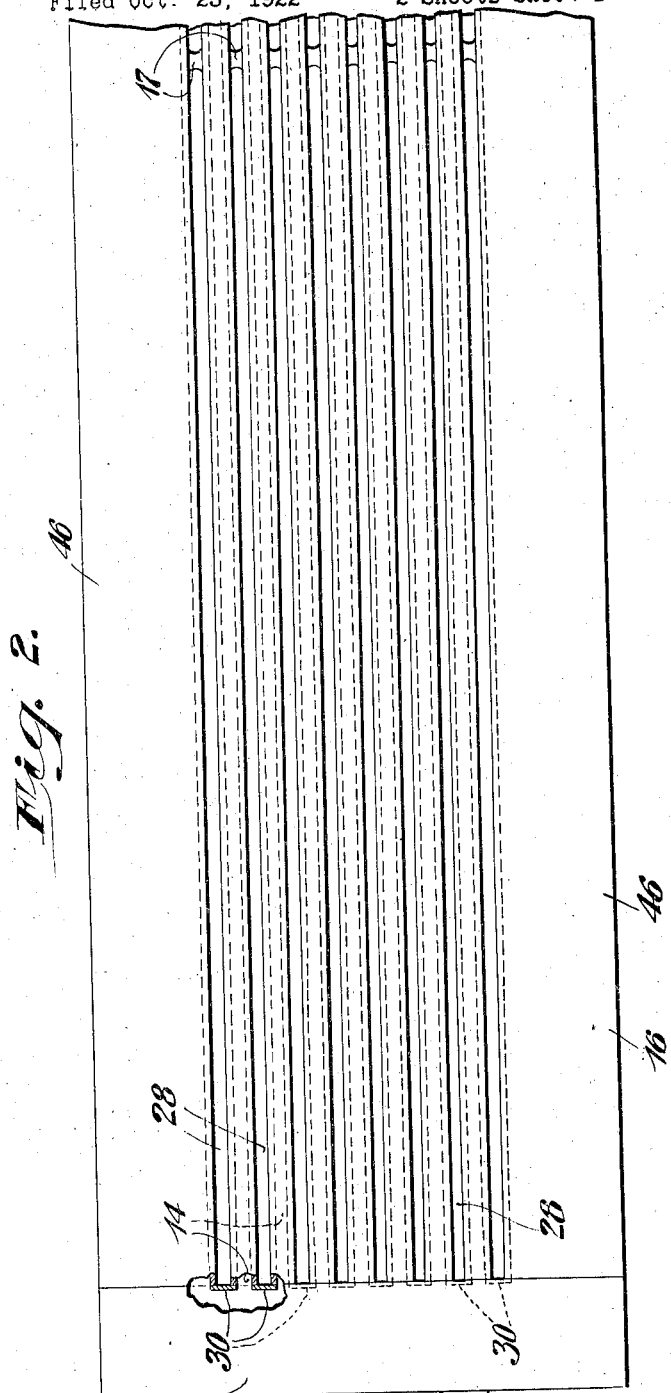
James P. Fisher Inventor
By His Attorney
Edmund G. Borden Aug. 31, 1926.    1,597,678

J. P. FISHER

HEAT INTERCHANGER

Filed Oct. 23, 1922    2 Sheets-Sheet 2

James P. Fisher Inventor
By His Attorney
Edmund G. Borden

Patented Aug. 31, 1926.

1,597,678

UNITED STATES PATENT OFFICE.

JAMES P. FISHER, OF BARTLESVILLE, OKLAHOMA, ASSIGNOR TO DOHERTY RESEARCH COMPANY, OF NEW YORK, N. Y., A CORPORATION OF DELAWARE.

HEAT INTERCHANGER.

Application filed October 23, 1922. Serial No. 596,223.

The present invention relates to a heat interchanger and, more particularly to a heat interchanger in which heat is transferred from one confined flowing stream to another confined flowing stream through a separating and heat transferring wall or partition.

The capacity of a heat interchanger of this type is dependent principally on the extent of surface between the fluids undergoing temperature changes and on the rapidity and uniformity with which the fluids are circulated in contact with the heat interchanging surfaces. The heat interchanging capacity for a given volume may be increased, and the loss of heat from the apparatus may be decreased, by increasing the extent of heat interchanging surface and by providing a thorough agitation and uniform distribution of the fluids over the extent of heat interchanging surface. In the ordinary types of heat interchangers heretofore used, however, a large ratio of heat interchanging surface to volume has involved the formation of small and intricate passages for the fluids and has been limited by the difficulty of obtaining a uniform distribution and flow of the fluids through the small and intricate passages required. Since the portions of the surface in contact with pocketed or sluggishly flowing fluid are not fully effective for heat transfer, the increasing lack of uniformity in the distribution of the fluids with very small, intricate, passages counteracts the advantages of increased surface. The production of small tortuous passages also involves further difficulties in the case of fluids carrying sediment, or capable of producing sediment, as there is a tendency for the sediment, to settle on the heat interchanging surfaces and clog the passages and create difficulties in cleansing the passages.

An object of the present invention is to provide a heat interchanger having a large heat interchanging surface and direct fluid passages providing a uniform distribution and flow of fluid over said surfaces.

Another object of the invention is to provide a heat interchanger having narrow passages of extensive surface which may be readily cleaned.

A further object of the invention is to provide a heat interchanger having an extensive heat interchanging surface and in which a rapid exchange of fluid between the fluid layers in intimate contact with the heat interchanging surface and the body of fluid may be obtained.

A still further object of the invention is to provide a heat interchanger in which the warmer fluid may be effectively insulated from loss of heat through the outer walls of the interchanger.

With these and other objects in view, the invention comprises the apparatus described and set forth in the following specification and claims.

The various features of the invention are illustrated in the accompanying drawings in which:

Figure 1 is a vertical sectional view of an interchanger illustrating a preferred form of embodiment of the invention.

Figure 2 is a plan view of the interchanger partition element.

Figure 3:
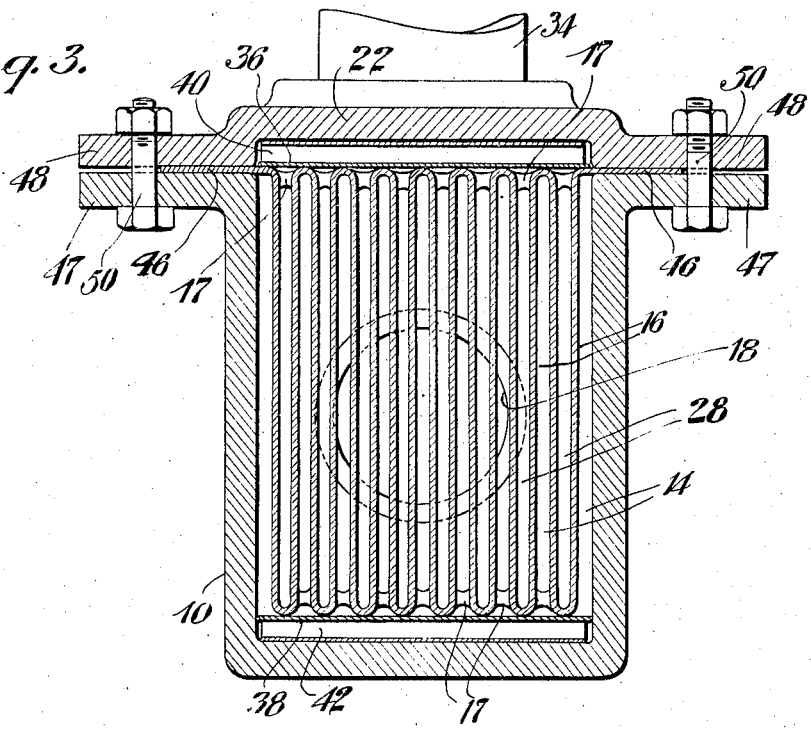
Figure 3 is an enlarged cross sectional view of the interchanger taken on line 3—3 of Figure 1.
Figure 4:
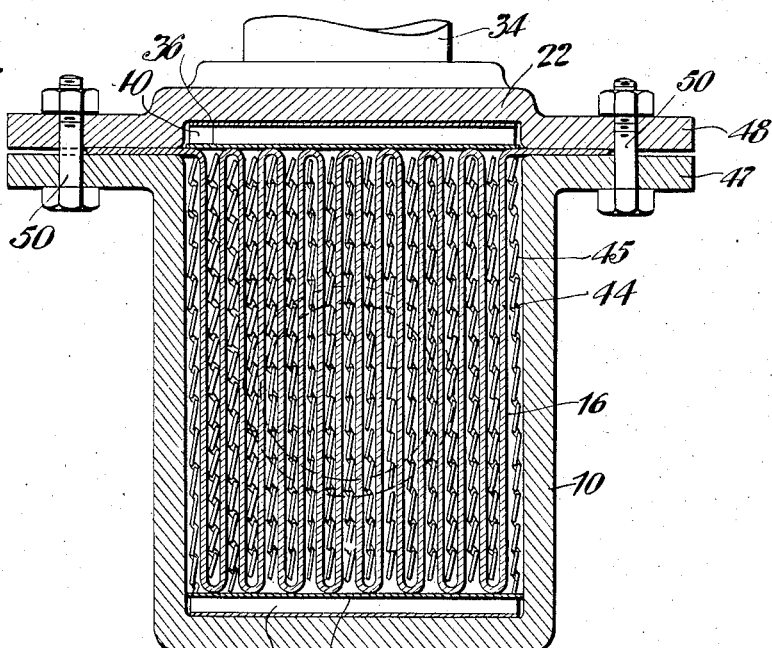
Figure 4 is a cross sectional view of the interchanger taken similarly to that of Figure 3, showing the position of agitating or fluid deflecting plates in the fluid passages of the interchanger.

In the present invention the warmer and cooler fluids are caused to flow in thin, uniformly flowing, direct streams interposed between each other and separated by a thin partition wall through which the interchange of heat takes place. An exchange of fluid between the fluid layers adjacent said partition and the body of flowing fluid is also preferably provided, thereby insuring a rapid convection of heat throughout the width of the streams between the separating partitions.

The heat interchanging partition is preferably formed into a number of long, narrow, closely spaced troughs, through which one of the fluids flows, and a number of narrow direct passages interposed therebetween, through which the other fluid flows. The partition is mounted in a casing, capable of withstanding the pressures under which the fluids are supplied, in such a manner that it may be readily removed and cleaned. The partition troughs are of sufficient depth to extend nearly from one wall of the casing to the opposite wall, and the passage of fluid other than through the interposed troughs and interposed passages is prevented by suitable obstructions between the tops of the troughs and the top wall of the casing and between the bottoms of the troughs and the bottom wall of the casing. These obstructions are preferably so arranged as to form a quiescent layer of fluid adjacent the top and bottom walls which serves to insulate the flowing fluid from loss of heat.

The partition troughs are preferably formed of straight walls and the streams of fluid are broken up and convection currents formed by deflecting means positioned in and between the troughs and having obliquely positioned surfaces, such as those provided by expanded metal lath. These means are removably supported in the interchanger and may be removed when the partition and troughs are to be cleaned.

Referring more particularly to the accompanying drawings, one of the heat interchanging fluids, preferably the cooler, heat receiving, fluid, is admitted to one end of a casing 10 through an inlet pipe 12 and is distributed among a number of passages 14 extending lengthwise of the casing 10 between trough like folds of a partition wall 16 along the opposite side of which the hotter heating fluid flows. The distance between the walls of the folds is very short and the folds provide narrow, straight passages of uniform width in which each portion of the fluid flows in close proximity to the heat transferring walls of the partition. To insure a uniform spacing of the passages between the folds of the partition 16 spacing lugs 17 are soldered or welded to the partition in each passage. In passing through these passages the fluid is rapidly heated by the transfer of heat from the heating fluid and is received at the opposite end and removed through an outlet pipe 18.

The heating fluid is received through an inlet pipe 34, positioned at the opposite end of the casing from the pipe 12 when a counter current flow is desired, and is received on the opposite side of the partition 16 from the heat receiving fluid. In the embodiment illustrated in the accompanying drawings, the pipe 34 enters the casing through a cover 22 and the fluid is received in a shallow passage 32 between the cover 22 and a flat end portion 26 secured to the partition wall 16. From the passage 32 the fluid is distributed to a number of trough like passages 28 interposed between the passages 14 and separated from the passages 14 by the partition wall 16. Both ends of the trough like passages 28 are closed, as at 30 by strips of metal which are integral with the end pieces 26 and are welded to the partition 16 so as to close the ends of the troughs. The heating fluid is therefore caused to flow through the troughs 28 in a counter current direction to the flow of the fluid in the passages 14, imparting heat to the fluid in the passage 14 through the thin partition walls 16. At the opposite ends of the trough like passages 28 the fluid is received in a collecting passage 24 between the flat portion 26 of the partition and the cover 22 and leaves through an outlet pipe 20.

The heat receiving and heating fluids are caused to pass only through the passages 14 and 28 in close interposed relation and flow through other portions of the apparatus is positively prevented. To this end, the depth of the passages 14 and 28 is very nearly equal to the depth of the casing 10 and the lower side of the passages 14 and the upper sides of the troughs 28 are closed by plates 36 and 38, respectively. The passage of fluid through the narrow spaces between the plates 36 and 38 and the top and bottom of the casing respectively is prevented by means of resilient plates 40 and 42 having corrugations arranged transversely of the passages. Some fluid is pocketed between these corrugations and being in a quiescent condition serves to insulate the circulating fluids from loss of heat. Through this construction, also, a close contact and closure of the sides of the passages 14 and 28 is insured regardless of inequalities in depth of the casing and troughs.

Since fluids are, in general, good insulators of heat as compared with the metal of which the heat transferring partition is formed, a comparatively thin, stationary, film or layer of fluid adjacent the partition wall offers a comparatively large resistance to the conduction of heat. To facilitate the transfer of heat to the body of fluid, therefore, eddies are formed to carry portions of fluid into contact with the partition walls and back into the body of the fluid and thus transfer heat by convection. For this purpose plates 44, having obliquely positioned faces 45, as, for example, the ordinary type of expanded metal lath, are placed in the passages 14 and 28. These plates create eddy or oblique currents in the flowing fluids, which increase the transfer of heat by convection, and also form heat conducting metallic paths from the partition walls to the interior of the flowing streams.

The partition wall 16 is preferably supported in the casing 10 to seal the fluids on its opposite sides from each other, by extending the partition outwardly at each side to form flanges 46 and uniting the flanges with the end pieces 26. The flanges 46 and end pieces 26 may be clamped between a flange 47 formed around the upper edge of casing 10 and a flange 48 on the cover 22 by bolts 50 to form a tight joint. When the interchanger is to be cleaned it is only necessary to remove the bolts 50 and cover 22 and the partition 16. The plates 44 may then be removed and access to the straight walls of the passages 14 and 28 is thereby provided.

The partition wall 16 may be made of comparatively thin material inasmuch as there is ordinarily very little difference in pressure between the heating and heat receiving fluids. The walls of the casing are, however made of comparatively thick material to withstand the pressure of the fluids. If there be considerable difference in pressure in the passages 14 and 28, the deflecting member 44 may be made to act as struts to support walls 16 and therefore the partition may be made thin even when considerable pressure difference exists between these passages.

Since it is desirable to maintain the same velocity of flow of the liquid at opposite sides of the diaphragm through which heat is being transferred, it is preferred to have the cross sectional areas of the passages 14 and 28 the same if the same quantity of fluid is passing on each side of the diaphragm. If, however, the quantity of fluid flowing through the passages 14 and 28 is different, it is preferred to vary the cross sectional areas of the passages in order to maintain substantially the same velocity of flow in each passage. Furthermore, the cross sectional areas of the passages may be varied by using deflecting plates of different forms within the passages, in order to maintain substantially the same velocity of flow in the passages. The deflecting plates also may be designed to have a definite control of the velocity of flow of liquid in the passages and different forms of deflecting plates may be used.

Having described the invention what I claim and desire to secure by Letters Patent is:

1. In a heat interchanger, a casing, a partition in said casing forming on one side narrow, spaced, trough-like passages of a depth slightly less than that of said casing and extending lengthwise of said casing and forming on the opposite side narrow, lengthwise passages interposed between said trough-like passages, and means for maintaining a substantially quiescent layer of fluid in the spaces between the top and bottom portions of said passages and the adjacent walls of said casing.

2. In a heat interchanger, a casing, a partition in said casing forming narrow, spaced trough-like passages of a depth slightly less than that of said casing and extending lengthwise of said casing and forming narrow, lengthwise passages between said trough-like passages, and transversely corrugated plates between the tops and bottom portions of said passages, and the adjacent top and bottom walls of said casing.

3. In a heat interchanger, a casing, a partition in said casing having narrow, spaced, trough-like passages, and forming narrow lengthwise extending passages interposed between said trough-like passages, and plates having oblique deflecting surfaces in said passages.

4. In a heat interchanger, a casing having an inlet at one end and an outlet at the opposite end, a longitudinal wall for said casing, an inlet opening into said wall near one end and an outlet from said wall at the opposite end, a partition having its edges inserted between said wall and the edges of the other walls of said casing and having a number of narrow, trough-like passages extending lengthwise of said casing and of a depth only slightly less than that of said troughs, and fillers between the top and bottom portions of said passages and the adjacent walls of said casing, transversely corrugated to obstruct lengthwise passage of fluid.

5. In a heat interchanger, a casing, having an inlet at one end and an outlet at the other end, a wall for said casing having an inlet adjacent one end and an outlet adjacent the other end, a partition having its edges inserted between said wall and the other walls of said casing and having a number of trough-like passages extending lengthwise of said casing and a number of narrow passages interposed between said trough-like passages and separated therefrom by said partition, means for restricting the flow of fluid to said passages, and means in said passages for causing said fluid to move obliquely to said partition walls while passing through said passages.

6. In a heat interchanger, a casing having an inlet at one end and an outlet at the other end, a wall for said casing having an inlet adjacent one end and an outlet adjacent the opposite end, a partition having its edges held between said cover and the edges of the remaining walls and forming on its opposite sides interposed narrow passages extending approximately the depth of said casing, and expanded metal lath in said passages.

7. In a heat interchanger, an elongated casing, a thin walled partition extending lengthwise of said casing and dividing said casing into two compartments, lengthwise folds in said partition extending across said casing and forming interposed narrow passages on opposite sides of said partition, means for admitting fluids to and removing fluids from opposite ends of said compartments and resilient filler means between the top and bottom portions of said folds to obstruct lengthwise flow of fluid other than through said passages.

8. In a heat interchanger, a casing, a partition dividing the casing into two chambers, said partition having a number of spaced parallel folds forming a plurality of trough-like passages of uniform width on each side of the partition, and means disposed along adjacent loops of the folds for maintaining the passages of uniform width throughout their length.

In testimony whereof I affix my signature.

JAMES P. FISHER.